US008696463B2

(12) United States Patent
Potts et al.

(10) Patent No.: US 8,696,463 B2
(45) Date of Patent: Apr. 15, 2014

(54) SYSTEM AND METHOD FOR INTEGRATED PLAYER TRACKING AND CASH-ACCESS

(75) Inventors: Craig Potts, Henderson, NV (US); Richard Beer, Prior Lake, MN (US)

(73) Assignee: Global Cash Access, Inc., Las Vegas, NV (US)

( * ) Notice: Subject to any disclaimer, the term of this patent is extended or adjusted under 35 U.S.C. 154(b) by 175 days.

(21) Appl. No.: 10/957,283

(22) Filed: Oct. 1, 2004

(65) Prior Publication Data

US 2005/0107156 A1 May 19, 2005

Related U.S. Application Data

(60) Provisional application No. 60/508,063, filed on Oct. 1, 2003.

(51) Int. Cl.
*A63F 13/12* (2006.01)

(52) U.S. Cl.
USPC .................. 463/42; 463/25; 463/29; 705/39; 705/44; 235/380; 902/23

(58) Field of Classification Search
USPC ............ 463/25, 20, 40–41, 42; 235/275, 379, 235/380, 381, 382.5; 902/23; 273/138.1
See application file for complete search history.

(56) References Cited

U.S. PATENT DOCUMENTS 4,689,742 A 8/1987 Troy et al.
4,764,666 A 8/1988 Bergeron
4,882,473 A 11/1989 Bergeron et al.
5,038,022 A * 8/1991 Lucero ............................ 463/25
5,179,517 A 1/1993 Sarbin et al.
5,265,874 A 11/1993 Dickinson et al.
5,321,241 A 6/1994 Craine
5,429,361 A 7/1995 Raven et al.
5,457,306 A * 10/1995 Lucero .......................... 235/380

(Continued)

FOREIGN PATENT DOCUMENTS

EP 1 107 196 6/2001
GB 2 380 687 4/2003

(Continued)

OTHER PUBLICATIONS

International Search Report for Applic. No. PCT/US04/32357 of Oct. 13, 2005.

(Continued)

*Primary Examiner* — Damon Pierce
(74) *Attorney, Agent, or Firm* — Weide & Miller, Ltd.

(57) ABSTRACT

The present invention relates to a system and method for integrating player tracking and cash access in a casino or other gaming environment. One aspect of the invention allows for fund access and management wherein gaming machines, such as slot machines, receive playable credits directly from a patron's banking or credit card account. Another aspect of the present invention relates to integrating player tracking and cash access transactions by allowing the players to provide a player tracking card for each financial transaction conducted in the casino. In return, the casino issues gaming or bonus points to the players for allowing their transactions to be tracked. Yet another aspect of the present invention consolidates the players' financial account information into a single casino database. Players can subsequently credit or debit cash from the players' financial accounts using any associated customer identification cards or otherwise receive such credits in other forms that permit negotiations, including quasi-cash documents.

59 Claims, 8 Drawing Sheets

(56) References Cited

U.S. PATENT DOCUMENTS

| | | | | |
|---|---|---|---|---|
| 5,470,079 | A | 11/1995 | LeStrange et al. | |
| 5,613,912 | A | 3/1997 | Slater | |
| 5,642,160 | A | 6/1997 | Bennett | |
| 5,663,546 | A | 9/1997 | Cucinotta et al. | |
| 5,679,938 | A | 10/1997 | Templeton et al. | |
| 5,741,183 | A | 4/1998 | Acres et al. | |
| 5,754,655 | A | 5/1998 | Hughes et al. | |
| 5,766,075 | A | 6/1998 | Cook et al. | |
| 5,770,533 | A | 6/1998 | Franchi | |
| 5,813,912 | A | 9/1998 | Shultz | |
| 5,864,623 | A | 1/1999 | Messina et al. | |
| 5,902,983 | A | 5/1999 | Crevelt et al. | |
| 5,919,091 | A | 7/1999 | Bell et al. | |
| 5,959,277 | A | 9/1999 | Lucero | |
| 5,991,410 | A | 11/1999 | Albert et al. | |
| 5,999,624 | A | 12/1999 | Hopkins | |
| 6,001,016 | A | 12/1999 | Walker et al. | |
| 6,044,360 | A | 3/2000 | Picciallo | |
| 6,048,269 | A | 4/2000 | Burns et al. | |
| 6,048,271 | A | 4/2000 | Barcelou | |
| 6,064,987 | A | 5/2000 | Walker et al. | |
| 6,124,947 | A | 9/2000 | Seo | |
| 6,162,122 | A | 12/2000 | Acres et al. | |
| 6,168,522 | B1 * | 1/2001 | Walker et al. | 463/25 |
| 6,244,958 | B1 | 6/2001 | Acres | |
| 6,275,991 | B1 | 8/2001 | Erlin | |
| 6,293,866 | B1 | 9/2001 | Walker et al. | |
| 6,302,793 | B1 * | 10/2001 | Fertitta et al. | 463/25 |
| 6,347,738 | B1 | 2/2002 | Crevelt et al. | |
| 6,352,205 | B1 | 3/2002 | Mullins et al. | |
| 6,361,437 | B1 | 3/2002 | Walker et al. | |
| 6,409,595 | B1 | 6/2002 | Uihlein et al. | |
| 6,431,983 | B2 | 8/2002 | Acres | |
| RE37,885 | E | 10/2002 | Acres et al. | |
| 6,486,768 | B1 | 11/2002 | French et al. | |
| 6,487,284 | B1 | 11/2002 | Campbell | |
| 6,505,772 | B1 * | 1/2003 | Mollett et al. | 235/379 |
| 6,547,131 | B1 | 4/2003 | Foodman et al. | |
| 6,575,832 | B1 | 6/2003 | Manfredi et al. | |
| 6,577,733 | B1 | 6/2003 | Charrin et al. | |
| 6,579,179 | B2 | 6/2003 | Poole et al. | |
| 6,585,598 | B2 | 7/2003 | Nguyen et al. | |
| 6,601,040 | B1 | 7/2003 | Kolls | |
| 6,607,441 | B1 * | 8/2003 | Acres | 463/25 |
| 6,628,939 | B2 | 9/2003 | Paulsen et al. | |
| 6,675,152 | B1 | 1/2004 | Prasad et al. | |
| 6,676,522 | B2 | 1/2004 | Rowe et al. | |
| 6,682,421 | B1 | 1/2004 | Rowe et al. | |
| 6,709,333 | B1 | 3/2004 | Bradford et al. | |
| 6,800,029 | B2 | 10/2004 | Rowe et al. | |
| 6,846,238 | B2 | 1/2005 | Wells | |
| 6,851,607 | B2 | 2/2005 | Orus et al. | |
| 6,852,031 | B1 | 2/2005 | Rowe | |
| 6,866,586 | B2 | 3/2005 | Oberberger et al. | |
| 6,951,302 | B2 | 10/2005 | Potts | |
| 6,997,807 | B2 * | 2/2006 | Weiss | 463/25 |
| 7,003,496 | B2 | 2/2006 | Ishii et al. | |
| 7,094,149 | B2 | 8/2006 | Walker et al. | |
| 7,168,089 | B2 | 1/2007 | Nguyen et al. | |
| 7,311,605 | B2 | 12/2007 | Moser | |
| 2001/0022849 | A1 | 9/2001 | Simonoff | |
| 2001/0050311 | A1 | 12/2001 | Avellino | |
| 2002/0002075 | A1 * | 1/2002 | Rowe | 463/25 |
| 2002/0039921 | A1 | 4/2002 | Rowe et al. | |
| 2002/0039923 | A1 | 4/2002 | Cannon et al. | |
| 2002/0045476 | A1 | 4/2002 | Poole et al. | |
| 2002/0068624 | A1 | 6/2002 | Ellis | |
| 2002/0103027 | A1 | 8/2002 | Rowe et al. | |
| 2002/0132664 | A1 | 9/2002 | Miller et al. | |
| 2002/0147047 | A1 | 10/2002 | Letovsky et al. | |
| 2002/0177479 | A1 | 11/2002 | Walker et al. | |
| 2003/0033534 | A1 | 2/2003 | Rand et al. | |
| 2003/0036425 | A1 | 2/2003 | Kaminkow et al. | |
| 2003/0045353 | A1 | 3/2003 | Paulsen et al. | |
| 2003/0078094 | A1 | 4/2003 | Gatto et al. | |
| 2003/0087692 | A1 | 5/2003 | Weiss | |
| 2003/0104865 | A1 | 6/2003 | Itkis et al. | |
| 2003/0106769 | A1 | 6/2003 | Weiss | |
| 2003/0119585 | A1 * | 6/2003 | Walker et al. | 463/25 |
| 2003/0176218 | A1 | 9/2003 | LeMay et al. | |
| 2003/0186747 | A1 | 10/2003 | Nguyen et al. | |
| 2003/0211883 | A1 | 11/2003 | Potts | |
| 2003/0222153 | A1 | 12/2003 | Pentz et al. | |
| 2003/0228902 | A1 | 12/2003 | Walker et al. | |
| 2003/0236749 | A1 * | 12/2003 | Shergalis | 705/43 |
| 2004/0053693 | A1 | 3/2004 | An | |
| 2004/0063494 | A1 | 4/2004 | Oram et al. | |
| 2004/0093303 | A1 | 5/2004 | Picciallo | |
| 2004/0173673 | A1 | 9/2004 | Potts | |
| 2004/0214643 | A1 | 10/2004 | Parrott et al. | |
| 2004/0229671 | A1 | 11/2004 | Stronach et al. | |
| 2005/0009600 | A1 | 1/2005 | Rowe et al. | |
| 2005/0054417 | A1 | 3/2005 | Parrott et al. | |
| 2005/0054446 | A1 | 3/2005 | Kammler et al. | |
| 2005/0080728 | A1 | 4/2005 | Sobek | |
| 2005/0096124 | A1 | 5/2005 | Stronach | |
| 2006/0148559 | A1 | 7/2006 | Jordan et al. | |
| 2006/0160610 | A1 | 7/2006 | Potts | |
| 2007/0060309 | A1 | 3/2007 | Yankton et al. | |
| 2007/0066386 | A1 | 3/2007 | Shields | |
| 2007/0213124 | A1 | 9/2007 | Walker et al. | |

FOREIGN PATENT DOCUMENTS

| | | |
|---|---|---|
| WO | WO 93/23817 | 11/1993 |
| WO | WO 94/16781 | 8/1994 |
| WO | WO 97/13228 | 4/1997 |
| WO | WO 01/57617 | 8/2001 |

OTHER PUBLICATIONS

International Search Report for Applic. No. PCT/US04/32358 of Feb. 26, 2007.

AAMVA National Standard for the Driver License/Identification Card, Jun. 30, 2000, pp. 1-90.

Quinn, William, "Worth Their Weight in Gold," pp. 24-26, Apr. 1, 2003.

American Association of Motor Vehicle Administrator (AAMVA), document entitled "AAMVA National Standard for the Driver License / Identification Card—AAMVA DL/ID-2000";90 pgs; © 2000.

Examination Report issued by the Canadian Patent Office, dated Feb. 23, 2012; Serial No. 2541093; 5 pages.

* cited by examiner

SYSTEM AND METHOD FOR INTEGRATED PLAYER TRACKING AND CASH-ACCESS

BACKGROUND OF THE INVENTION

The present invention relates to a system and method for integrating player tracking and cash access transactions in a casino environment. Specifically, the invention relates to a system and method, used in a variety of environments including casinos, to facilitate cash-access/credit-access and player tracking.

Casino gaming is a highly popular activity in today's society. Often times, enjoyment of the casino gaming experience is predicated upon a player's ability to easily and effectively access a sufficient supply of money, which in turn allows the player to participate in gaming activities for a desired length of time. Casino patrons typically attempt to bring a sufficient amount of currency to the casino that can be used with various gaming machines or exchanged for negotiable chips or casino-issued cards. Not infrequently, however, patrons forget to bring a sufficient amount of currency to the casino or patrons deplete the supply they brought before they are ready for the gaming experience to end.

In these instances, the casino patrons will want to access additional currency, or otherwise extend their time playing the casino games, by withdrawing the necessary currency from a financial institution at which the player maintains an account. For example, a player with a financial institution card, such as a credit card, debit card, or bank card, can utilize an automated teller machine (ATM) that is located on the casino's premises to withdraw currency.

Such financial institution transactions are commonplace in casinos. However, existing cash access and cash advance systems often require manual entry of customer identification information as part of the transaction. Existing systems may also require the players to remember multiple PIN's that are associated with each of their financial intuition accounts or require that the players retrieve cash at an ATM and then physically transport the cash to a gaming machine. Although these current processes allow access to currency, players continue to look for more convenience while at the casino. Therefore, a need exists for a system and method of facilitating expeditious cash/credit access for players in a casino environment that minimizes the complications that currently exist for such transactions.

In addition to the complications that hinder current cash/credit access systems and methods, these current systems and methods also fail to provide comprehensive tracking of the players' financial transactions in casinos. While it is commonplace to attempt to track some of the patrons' actions in a casino that relate to gaming, these attempts typically fail to capture many financial transactions that occur on the casino's premises and to provide a comprehensive picture of the cash flow in the casino. Often casinos will provide patrons with player tracking cards that the player inserts at gaming machines, which allows the casino to monitor some of the patrons' gaming activities. As an incentive to use the player tracking cards, casinos often award gaming points to the patrons to encourage use of the cards. However, many financial transactions that occur in a casino are not effectively monitored or tracked by the casino.

The quality and breadth of current player tracking can be increased by providing additional incentives to the players. Therefore, in addition to the need for facilitating expeditious cash/credit access transactions, there is a concurrent need for providing more comprehensive tracking of players' financial transactions in casinos.

SUMMARY OF THE INVENTION

The present invention generally relates to a system and method for integrating player tracking and cash access in a casino or other gaming environment.

Integrated Player Tracking/Cash Access System on Gaming Machine

One aspect of the present invention relates to a system and method for accessing and managing funds for cashless gaming. A gaming machine is provided, which includes any type of apparatus designed for player betting such as a slot machine, and is located in a casino environment. To initiate a transaction, a player provides a bank card to the gaming machine. The phrase "bank card" encompasses any card issued to the player by a bank or another financial institution. For instance, the bank card may be an Automated Teller Machine (ATM) card, debit card, credit card, or POS card. The bank card typically bares a magnetic strip that includes machine readable information that can be read by a magnetic strip reader on the gaming machine. The bank card may be associated with an independent financial account that is typically unrelated to the casino.

After the player's bank card is introduced to the gaming machine, the machine electronically reads the card and retrieves the machine readable information. The gaming machine processes the information to translate it into a machine usable format, such as binary or hexadecimal code. After successfully processing the bank card, the gaming machine prompts the player to select a transaction type, such as a credit or debit transaction. Upon receiving a selection from the player to perform a credit transaction, which requests that credit be added to the gaming machine, the machine prompts the player to enter a desired credit value that the player wishes to add to the machine. If necessary, the machine will also prompt the player to enter a Personal Identification Number (PIN) that is associated with the independent financial account.

Once the gaming machine has collected the transaction type and desired credit value from the player, along with any other necessary information, the machine electronically issues a request to the independent financial account to transfer the desired credit value from the financial account to the gaming machine. The credit request includes the desired credit value and at least a portion of the data derived from the machine readable information, and the request is transmitted to an authorization center that is associated with the financial account. The authorization center determines whether to approve the request and acts as an intermediary between the gaming machine and the financial account. Upon approval of the request, the desired credit value is electronically transferred from the financial account to the gaming machine, and the player is then able to use the transferred credit on the gaming machine. This system and method allow a player to directly access funds for playing on a gaming machine without first visiting an ATM or other intermediate step for acquiring cash or credit.

When the gaming machine prompts the player to select a transaction type, the player may also select a debit transaction on the gaming machine. A debit transaction requests that the credit remaining on the gaming machine after the player has finished using the machine, or any credit won by the player on the gaming machine, be transferred to the independent financial account. The request effectively attempts to debit the gaming machine and credit the independent financial account. Upon receiving a selection from the player to perform a debit transaction, the gaming machine electronically issues a request to debit the player's gaming balance and transfer it to the independent financial account. The debit request, which is transferred to the authorization center, includes the dollar value to transfer and at least a portion of the machine readable information on the bank card. The authorization center determines whether to approve the request, and, upon approval, the winnings from the gaming machine are electronically transferred to the independent financial account.

Integrated Player Tracking/Cash Access System on ATM, CCCA, and Check Cashing Terminals Another aspect of the present invention relates to a system and method for integrating player tracking and cash access transactions in a gaming environment. To initiate a cash access transaction, a player introduces a bank card into a banking machine in a casino environment. The banking machine may take a variety of forms, such as an ATM, Credit Card Cash Advance kiosk (CCCA), Check Cashing Terminal, and a gaming device equipped with cashless gaming software. As previously noted, the term "bank card" includes any of the various card types issued by banks or other financial institutions, and the bank card typically bares a magnetic strip that includes machine readable information. The banking machine includes a magnetic strip reader that can read and process the machine readable information on the card. The bank card is also associated with an independent financial account that is typically unrelated to the casino.

After the player's bank card is introduced to the banking machine, the machine electronically reads the card and retrieves the machine readable information. The banking machine processes the information to translate it into a machine usable format, such as binary or hexadecimal code. After successfully processing the bank card, the banking machine prompts the player to enter a transaction type. If the player wishes to withdraw cash from the independent financial account, the player may select a cash withdrawal transaction on the banking machine and indicate a desired cash value.

The system maintains a database of bankcard numbers and associates each of those numbers to a player's name and, optionally, a player tracking number. In order to track the transaction and associate it with the specific player performing the cash request, the banking machine prompts the player to provide his or her player tracking card (PTC) into the machine. The PTC is typically a casino-issued card that includes a unique identifier and is associated with the player in a player transaction database. The database may include a variety of data including a player profile, player transaction information, and other data relating to the player's activities in the casino. The player swipes or feeds the PTC into the banking machine, and the machine electronically processes the PTC. For instance, if the unique identifier on the PTC is encoded in a barcode, the banking machine will include a barcode reader capable of reading the barcode and decoding the encoded unique identifier. Alternatively, if the unique identifier on the PTC is encoded in a magnetic strip, the banking machine includes a magnetic strip reader for reading the strip and decoding the unique identifier.

After acquiring the appropriate data from the bank card, the PTC, and the player, the banking machine electronically issues a request to the independent financial account to withdraw the desired cash value. The withdrawal request includes the desired value and at least a portion of the machine readable information on the bank card, and the request is transmitted to an authorization center. The authorization center is associated with the financial account and determines whether to approve the request. Upon approval of the request, the desired cash value is electronically transferred from the financial account to the banking machine and dispensed to the player in cash or gaming credit form.

The transaction is tracked so that the player's identity and the cash withdrawal amount are associated and stored in the transaction database. The transaction information can subsequently be used by the casino. The transaction information can provide the casino with valuable consumer behavior data, such as amounts and frequency of cash withdrawals by casino patrons. The casino, in turn, may issue gaming points to the player. The gaming points reward the player for offering the transaction information to the casino and for allowing that information to be tracked. Typically, gaming points can be redeemed for a variety of goods and services, such as free or discounted meals at the casino, hotel accommodations, and gift shop items. The number of points awarded to the player may be based on a variety of factors such as the number of cash withdrawal transactions performed by the player or the amount of cash withdrawn by the player. The overall system of integrating cash access and player tracking transactions thereby benefits both the players and the casino.

In an alternative embodiment, the system may operate without a multi-function banking machine that is capable of performing both cash access and player tracking functions as described above. Rather than provide the bank card and the PTC to a banking machine, these same cards may instead be presented to a casino representative. For instance, the casino may provide a central "cage" station at which a teller is available for processing the bank card and the PTC. If necessary, the teller will have card readers capable of processing magnetic strips, barcodes, or other forms of encoded information that resides on the bank card and the PTC. The teller will also have access to the transaction database and the authorization center, thereby allowing the teller to facilitate cash access and player tracking transactions. Aside from the added element of interacting with a casino representative, this alternative method operates similarly to the system described above.

Multi-Function Player Tracking Card

Yet another aspect of the present invention also relates to a system and method for integrating player tracking and enhanced cash access services in a gaming environment. First, an account is opened for a player at the casino. The system requires an initial setup by the player, where the player provides information to the casino. This is accomplished by having the player complete a form that includes personal data and information relating to at least one of the player's independent financial accounts. For instance, the player may provide the account information for one of the player's banking accounts or credit card accounts. The account information may include the player's name and other identifying information, an account and routing number, and a Personal Identification Number (PIN) if necessary to access the financial account. The player may also be required to provide other personal information such as the player's address, telephone number, and social security number. The information provided by the player is either entered electronically into a computer or entered onto a paper form and later entered into a computer by a casino representative. The player may also be required to prove his or her identity by providing a state-issued identification card, such as a driver's license.

Once the player has provided the appropriate personal information and account information, that information is stored in a player tracking database. The player is then issued a PTC that contains a unique identifier. The unique identifier is also stored in the player tracking database and associated with the player's personal information and financial account information.

With the player's casino account successfully opened, the player is able to use the PTC to access cash or credit for gaming purposes in the casino. For example, a cash access machine of the present invention, such as a multi-function ATM, may be adapted to electronically process the PTC. The cash access machine reads and electronically processes the PTC to retrieve the unique identifier. If the unique identifier on the card is encoded in a barcode, the cash access machine will include a barcode reader capable of reading and decoding the unique identifier. The machine then prompts the player to select a transaction type, and, in response, the player elects to perform a cash withdrawal.

The cash access machine communicates with the player tracking database to determine which financial account is associated with the unique identifier on the player's PTC. If more than one financial account is associated with the unique identifier, the machine may prompt the player to select one of the accounts for the withdrawal. Next, the cash access machine electronically issues a withdrawal request to the selected financial account to withdraw the desired cash value. The request includes the desired cash value and the necessary account information and PIN associated with the financial account, which the player provided at the time he or she opened the casino account.

The withdrawal request is transmitted to an authorization center that is associated with the financial account, and the authorization center determines whether to approve the request. Upon approval of the request, the desired cash value is electronically transferred from the financial account to the cash access machine. If the machine is an ATM, the cash value is typically dispensed to the player in cash form, which the player can then use in the casino. If the machine is a slot machine, or other gaming machine, the cash value may be directly credited to the machine and used for gaming purposes.

Importantly, because the financial account information is initially provided by the player and stored in the player tracking database, the subsequent withdrawal request can be issued to the independent financial account without requiring a bank card, such as an ATM card or credit card, from the player. The player tracking database links the unique identifier on the casino-issued PTC with all the necessary financial account information necessary to withdraw cash.

The withdrawal transaction is also tracked by the casino such that the unique identifier on the player's card and the cash withdrawal amount are associated with each other and stored in the transaction database. The casino may then issue gaming points to the player based on the number of withdrawal transactions or the amount withdrawn. If the player is identified by the system, the player tracking database may also store the awarded gaming points and associate them with the player's unique identifier. The gaming points reward the player for offering cash withdrawal information to the casino and for electing to use the system of the present invention to obtain cash or credit in the casino. The system thereby benefits both the player and the casino by integrating cash access and player tracking.

Embodiments of the present invention therefore may include electronically processing at least one card to retrieve machine readable information, which may further include processing an additional card. In a further embodiment, the electronic processing of at least one card retrieves a list of all financial accounts that have been associated with the card. In still a further embodiment, a customer may select a financial account from the list of financial accounts that have been associated with the card.

Other embodiments may include storing one or more requested transactions and not processing such requests until a predetermined event has occurred. In a further embodiment, this predetermined event is the customer requesting credits that exceed a pre-determined credit limit. In an alternate further embodiment, this predetermined event is a customer checking out of the hotel or casino.

Other embodiments are also disclosed including the use of an ATM or similarly equipped gaming machine for authorizing the transfer of money to the machine or ATM in order to be converted into a casino ticket. In this context, a casino ticket can be any number of identification cards or systems including a paper ticket with a bar code, a magnetic stripe card, a smart card, RFID or other portable digital memory that is encoded with personal and financial information. This casino ticket can then be used on another gaming machine as credit in connection with casino gaming or redeemed for cash. In the preferred embodiment, in order to redeem the casino ticket for cash, the customer can either present the casino ticket for validation by a cashier at a cashier cage or insert the casino ticket into a ticket redemption kiosk (including kiosks integrated with one or more casino game machines or other multi-purpose entertainment devices). The casino ticket could also be created in a way that permits (or limits) negotiation within different geographical areas (such as a group of mutually linked casinos, restaurants and service providers), to acquire different products or services (such as 50% or more must be used to purchase goods), to trigger different bonuses or awards (free games, discounts, casino points), or any number of features that either limit negotiation or enhance the functionality and features available to the player. These and other embodiments will be further described with reference to the figures below.

DETAILED DESCRIPTION OF THE PREFERRED EMBODIMENTS

Figure 1:
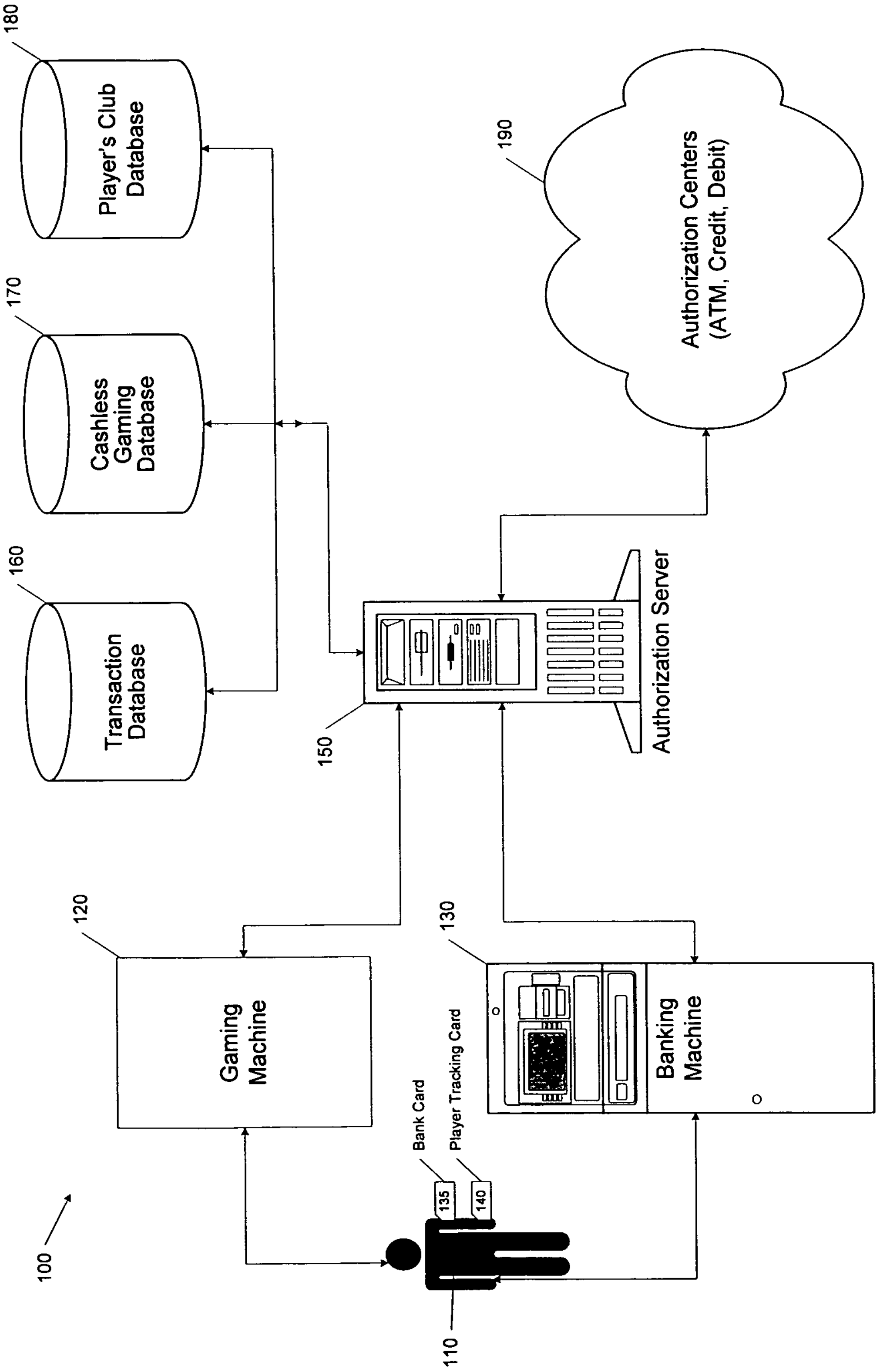
FIG. 1 is a block diagram of an integrated player tracking and cash access system in accordance with an embodiment of the present invention.

One embodiment of an integrated player tracking and cash-access system 100 is shown in FIG. 1. In a preferred embodiment, the system 100, which contains the elements described herein, is operated in a casino environment. The system 100 includes players 110 who interact with a plurality of gaming machines 120 and banking machines 130. The players interact with the machines through any methods known in the art such as buttons and touch-sensitive screens. A player 110 is issued a bank card 135 and a player tracking card (PTC) 140 as described in more detail herein. The gaming machine 120 and the banking machine 130 are configured to read the information contained on the bank card 135 and a PTC 140 as provided for in more detail below.

The PTC 140 is typically a casino-issued card, which is used to track the player's actions in the casino. The casino may award gaming points for certain player actions and associates the gaming points with the PTC. The bank card 135 may be any type of card that is issued to the player 110 by a bank or other independent financial institution, and the bank card is associated with an independent financial account at the financial institution. For instance, the bank card 135 may be an Automated Teller Machine (ATM) card, debit card, credit card, or POS card. The bank card 135 includes machine readable information, which, in a preferred embodiment, is encoded in a magnetic strip (not shown) on the card that can be read by a card reader (not shown) on the gaming machine 120.

As described in more detail below, a player 110 can bring his or her bank card 135 or PTC 140 to either the gaming machine 120 or the banking machine 130. The gaming machine 120 is configured to perform traditional gaming functions, such as providing an interactive slot machine game, and is also configured to allow the player 110 to perform cashless gaming and player tracking transactions. The banking machine 130 is configured to perform traditional transactions such as cash withdrawal, credit/debit transactions, and electronic fund transfers, which are well known in the art. The banking machine 130 of the present invention is also configured to perform cashless gaming and player tracking transactions as described herein.

To perform these functions, both the gaming machine 120 and the banking machine 130 communicate with an authorization server 150 to transmit information relating to the bank card 135 and a PTC 140 as well as other information relating to cash-access and player tracking transactions. While the authorization server 150 is typically located at or near the casino environment, it may also be physically located outside of the casino so long as it is configured to communicate with the gaming machine 120 and the banking machine 130. The casino, or a casino vendor, will typically maintain the authorization server 150 to ensure that it functions properly. The authorization server 150 stores a subset of the information it receives on a transaction database 160, a cashless gaming database 170, and a player's club database 180. The authorization server 150 also retrieves information from these databases, including information that is stored on the databases by the authorization server 150 as well as other information that resides on the databases.

The transaction database 160 stores information relating to the player's transactions including the types of transactions performed by the player 110 and the dollar amounts of those transactions. The transaction database 160 associates the transaction information with an identifier that uniquely identifies the player 110. In addition, the transaction database 160 may also store information regarding the player's credit history. When a commission is collected for utilizing the integrated player tracking and cash-access system 100, the appropriate commission information for each player 110 is also stored on the transaction database 160 as are commission fee overrides for certain players such as VIP's. The cashless gaming database 170 stores financial account information provided by the player 110, and the cashless gaming database 170 associates the account information with the player's unique identifier. The gaming points awarded to the player 110 are associated with the PTC 140 and stored on the player's club database 180. The player's club database 180 maintains each players' total awarded gaming points and increments and decrements the total points according to the players' accumulation and usage of points.

The authorization server 150 many also communicate with various authorization centers 190 to request authorization for the various transactions described herein. The authorization centers 190 are typically associated with financial accounts owned by the player and are configured to either credit or debit those financial accounts.

Integrated Player Tracking/Cash Access System on Gaming Machine

Figure 2:
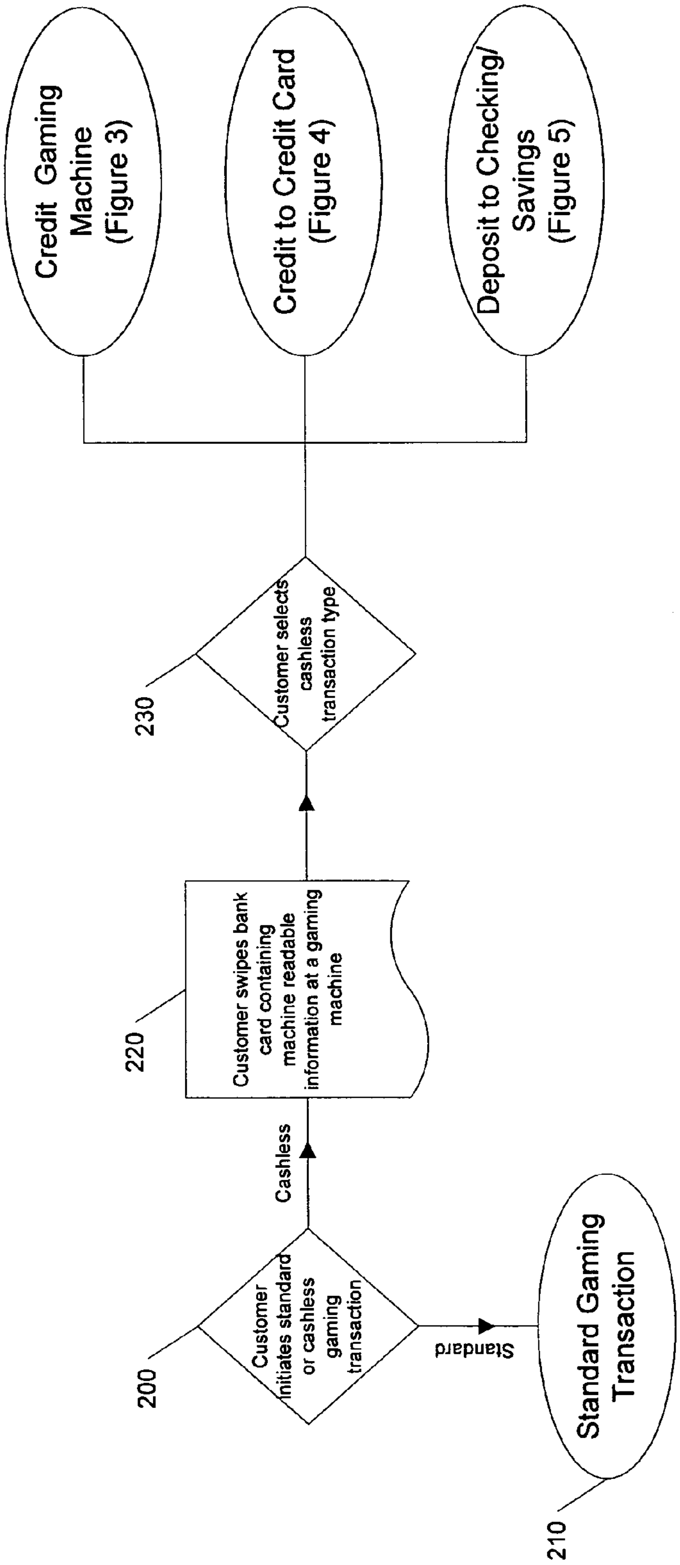
FIG. 2 is a flow diagram of a method for initiating a player tracking/cash access transaction on a gaming machine in accordance with the present invention.

In operation, and with reference to FIGS. 1 and 2, one aspect of the present invention relates to a system and method for accessing and managing funds for cashless gaming. At step 200, the player 110 selects either a standard gaming transaction or a cashless gaming transaction, and the banking machine receives the selection. At step 210, if the player 110 selects a standard gaming transaction, the gaming machine 120 operates as a traditional betting apparatus, such as a slot machine, and the player 110 uses cash or another known method to acquire credits on the gaming machine 110.

At step 220, if the player 110 wishes to perform a cashless transaction, which will credit the gaming machine 120, the player 110 provides the bank card 135 to the gaming machine 120. The player 110 swipes the bank card 135 through a card reader (not shown) of the gaming machine 120 or otherwise introduces the bank card 135 to the gaming machine 120 through a method known in the art.

After the player's bank card 135 is introduced to the gaming machine 120, the card reader electronically reads and decodes the machine readable information on the bank card 135. The gaming machine 120 processes the information to translate it into a machine usable format, such as binary or hexadecimal code. After successfully processing the bank card 135, the gaming machine 120 prompts the player to select a transaction type, such as crediting the gaming machine 120 or crediting a financial account that is associated with the bank card 135. At step 230, the player 110 selects a cashless transaction type. In one embodiment of the present invention, the transaction types include "Credit Gaming Machine," "Credit to Credit Card," and "Deposit to Checking/Savings."

Figure 3:
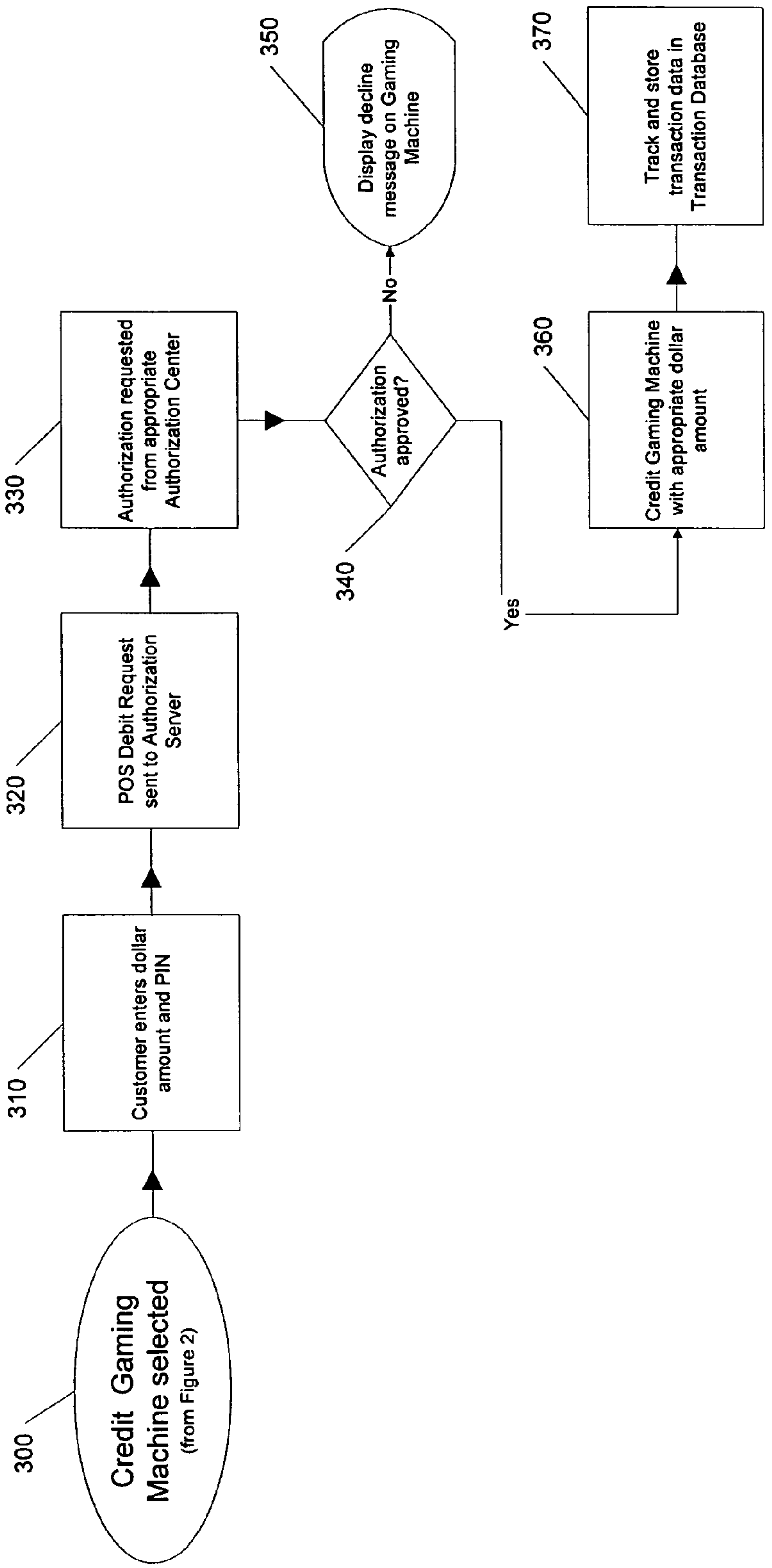
FIG. 3 is a flow diagram of a method for completing a player tracking/cash access transaction where the gaming machine is credited in accordance with the present invention.

With reference to FIGS. 1 and 3, if the player 110 selects the transaction type "Credit to Gaming Machine," step 300, the gaming machine 120 proceeds with a gaming machine credit transaction, which requests that a specified credit be added to the gaming machine 120 from the player's independent financial account. At step 310, the gaming machine 120 prompts the player 110 to enter a desired credit value that the player 110 wishes to add to the gaming machine 120. If necessary, the gaming machine 120 will also prompt the player 110 to enter a PIN, which is used to verify permission to access to the independent financial account, and any other information that is required to transfer funds from the independent financial account.

At step 320, the gaming machine 120 electronically issues a debit request, such as a Point of Sale (POS) debit request, to the authorization server 150, which attempts to debit the independent financial account and credit the gaming machine 120. The request includes the desired credit value and at least a portion of the data derived from the machine readable information.

Although the request attempts to transfer the desired credit value to the gaming machine 120, the total amount requested from the independent financial account may actually exceed the desired credit value when a commission is charged for performing the transaction. The authorization server 150 determines the total amount to request from the independent financial account; the total amount is typically the desired credit value plus a commission or transaction fee. The appropriate commission may be determined based on the specific player 110 requesting the funds and a player profile that is associated with the player. The player profile (not shown), which indicates the player's preference level, may be stored on the transaction database 160 or player's club database 180. For instance, a new player may have a standard commission taken out of his or her winnings, whereas a VIP player may have the commission waived altogether based on the VIP's player profile.

At step 330, once the total request amount has been established, the authorization server 150 transmits the debit request to the authorization center 190, which is associated with the independent financial account. At step 340, the authorization center 190 determines whether to approve the request. At step 350, if the request is not approved by the authorization center 190, a decline message is transmitted from the authorization center 190 to the authorization server 150. The authorization server then 150 instructs the gaming machine 120 to display a message to the player 110 indicating that the gaming machine 120 was not credited and that the player 110 may see a casino cashier (not shown) if the player believes an error has occurred.

At step 360, if the request is approved by the authorization center 190, the desired credit value is electronically transferred from the financial account to the gaming machine 120 via the authorization server 150. If a commission is required for the transaction, the additional amount of the commission is also transferred from the independent financial account. The desired credit value is credited to the gaming machine 120, and the player 110 is able to use the transferred credit to place bets on the gaming machine 120 and perform standard gaming transactions as described in step 210.

At step 370, the authorization server 150 tracks the successful request, and data relating to the transaction is stored in the transaction database 160. The data stored in the transaction database 160 may include the dollar value credited to the machine and the commission paid for the transaction. If the authorization server 150 has identified the player 110 performing the transaction, the player's identity may also be stored in the transaction database 160 and associated with the other transaction data. The authorization server 150 may identify the player 110 by requesting that the player enter identifying information into the gaming machine 120. The identifying information may be provided by having the player 110 swipe the PTC 140, which uniquely identifies the player 110, through the card reader on the gaming machine 120. If the player is awarded gaming points for performing a successful cashless gaming transaction, the points may be accumulated, stored, and associated with the player 110 on the player's club database 180.

Figure 4:
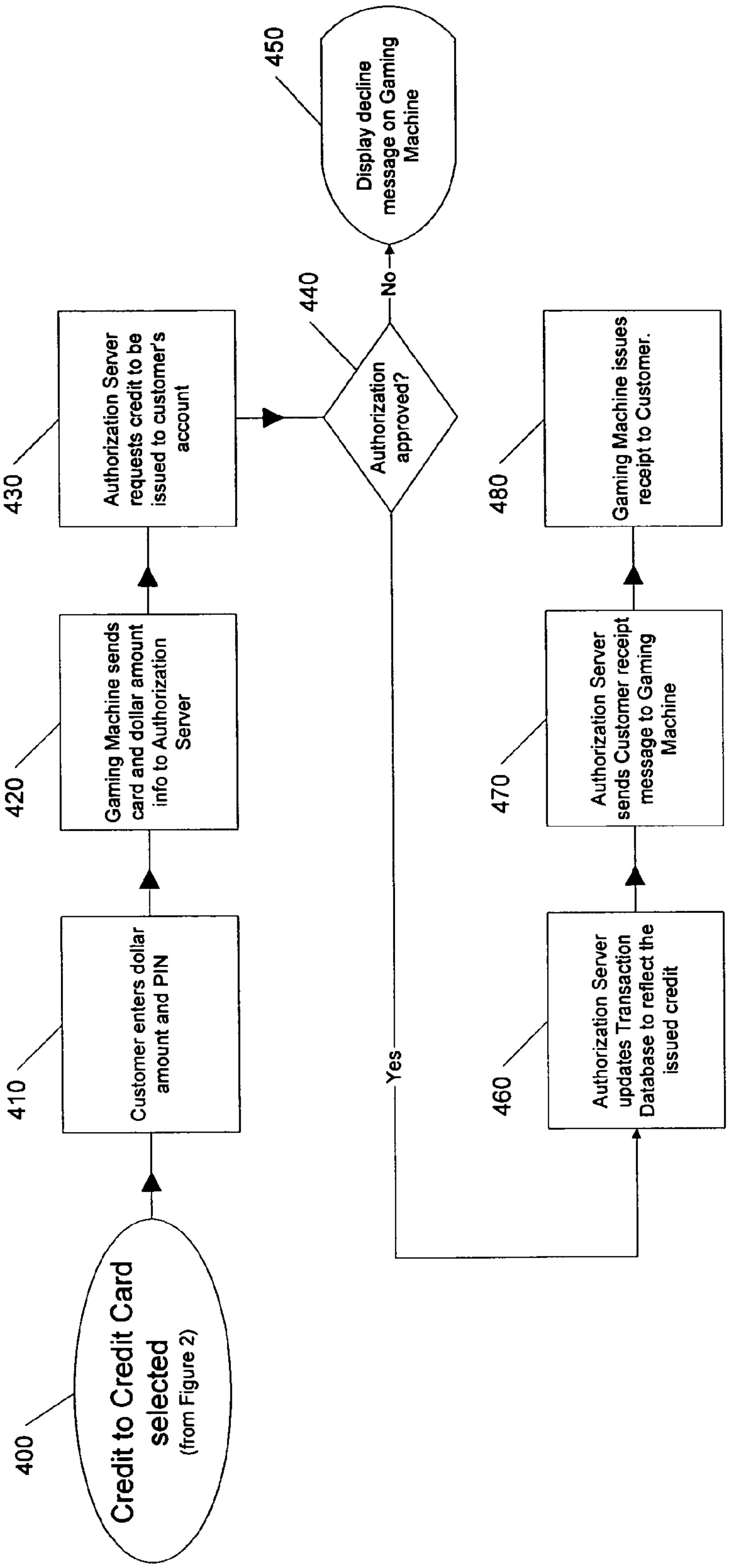
FIG. 4 is a flow diagram of a method for completing a player tracking/cash access transaction where a credit card account is credited in accordance with the present invention.

With reference to FIGS. 1 and 4, if the player 110 selects the transaction type "Credit to Credit Card," step 400, the gaming machine 120 proceeds with a credit to credit card transaction, which requests that credit be added to the independent financial account. This type of transaction is particularly appropriate when the player 110 has completed playing on the gaming machine 120 and wishes to "cash out" his or her winnings or the remaining credit on the gaming machine. The player 110 may cash out either all of the credits or a portion of the credits. In this aspect of the present invention, the independent financial account is typically a credit card account, and the bank card 135 is typically a credit card that is associated with the credit card account.

At step 410, the gaming machine 120 prompts the player 110 to enter a desired credit value that the player 110 wishes to add to the independent financial account that is associated with the bank card 135. If necessary, the gaming machine 120 will also prompt the player 110 to enter a PIN, which is used to verify permission to access to the independent financial account, and any other information that is required to transfer finds to the independent financial account.

At step 420, the gaming machine 120 electronically issues a credit request to the authorization server 150. The request includes the desired credit value and at least a portion of the data derived from the machine readable information on the bank card 135. Although the request attempts to transfer the desired credit value to the independent financial account, the total amount transferred to the independent financial account may actually be less than the desired credit value if a commission is charged for performing the transaction. The authorization server 150 determines the total amount to request to transfer to the independent financial account. The total amount is typically the desired credit value less a commission or transaction fee.

At step 430, once the total request amount has been established, the authorization server 150 transmits the credit request to the authorization center 190, which is associated with the independent financial account. At step 440, the authorization center 190 determines whether to approve the request, and if the request is approved, the independent financial account is credited with the total request amount. At step 450, if the request is not approved by the authorization center 190, a decline message is transmitted from the authorization center 190 to the authorization server 150. The authorization server then 150 instructs the gaming machine 120 to display a message to the player 110 indicating that the independent financial account was not credited.

At step 460, if the request is approved and the total request amount is credited to the independent financial account, the authorization server 150 receives notification from the authorization center 190 of the successful request, and the authorization server 150 updates the transaction database 160 to reflect the completed transaction. Data relating to the transaction, such as the dollar value credited to the financial account and the commission paid for the transaction, is stored on the transaction database 160. If the authorization server 150 has identified the player 110 performing the transaction, the player's identity may also be stored in the transaction database 160 and associated with the other transaction data. If the player is awarded gaming points for performing a successful cashless gaming transaction, the points may be accumulated, stored, and associated with the player 110 on the player's club database 180. At step 470, the authorization server 150 transmits a receipt message to the gaming machine 120, and at step 480, the gaming machine 120 issues a receipt to the player 110.

Figure 5:
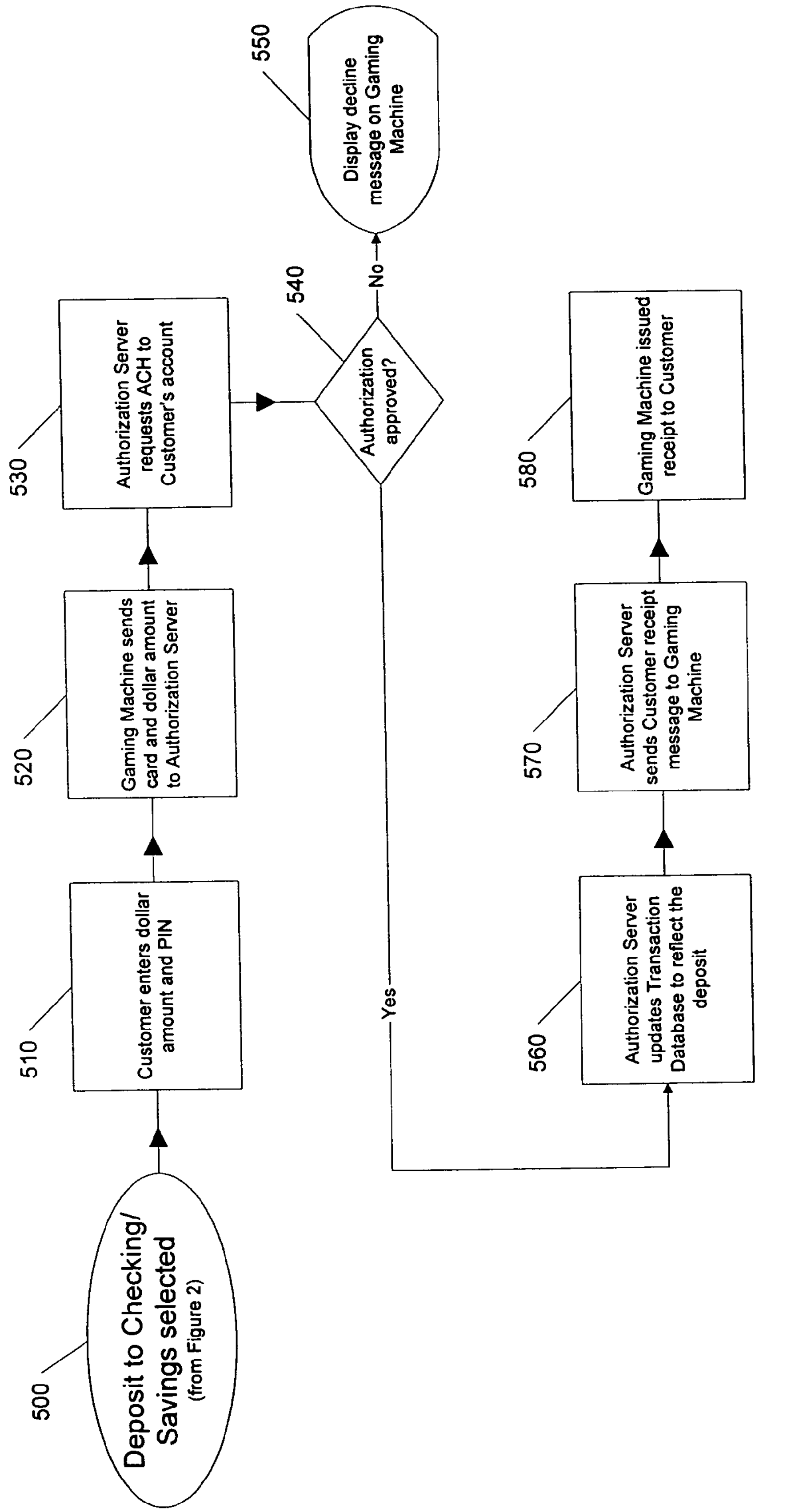
FIG. 5 is a flow diagram of a method for completing a player tracking/cash access transaction where a checking or savings account is credited in accordance with the present invention.

With reference to FIGS. 1 and 5, if the player 110 selects the transaction type "Deposit to Checking/Savings," step 500, the gaming machine 120 proceeds with a deposit to checking or savings account transaction. This transaction requests that a deposit be made to the independent financial account. In this aspect of the present invention, the independent financial account is typically a checking or savings account, and the bank card 135 is typically an ATM card that is associated with the checking or savings account. This type of transaction is also appropriate when the player 110 has completed playing on the gaming machine 120 and wishes to cash out.

At step 510, the gaming machine 120 prompts the player 110 to enter a desired credit value that the player 110 wishes to add to the independent financial account that is associated with the bank card 135. If necessary, the gaming machine 120 will also prompt the player 110 to enter a PIN, which is used to verify permission to access to the independent financial account, and any other information that is required to transfer finds to the independent financial account.

At step 520, the gaming machine 120 electronically transmits a deposit request to the authorization server 150. The request includes the desired deposit value and at least a portion of the data derived from the machine readable information on the bank card 135. The authorization server 150 determines the total amount to request to transfer to the independent financial account. The total amount is typically the desired deposit value less a commission or transaction fee.

At step 530, once the total request amount has been established, the authorization server 150 issues a deposit request, such as an Automated Clearing House (ACH) request, to the authorization center 190, which is associated with the independent financial account. At step 540, the authorization center 190 determines whether to approve the request, and if the request is approved, the total request amount is deposited in the independent financial account. At step 550, if the request is not approved by the authorization center 190, a decline message is transmitted from the authorization center 190 to the authorization server 150. The authorization server then 150 instructs the gaming machine 120 to display a message to the player 110 indicating that the deposit was not made to the independent financial account.

At step 560, if the request is approved and the total request amount is deposited in the independent financial account, the authorization server 150 receives notification from the authorization center 190 of the successful request, and the authorization server 150 updates the transaction database 160 to reflect the deposit. Data relating to the transaction, such as the dollar value deposited to the financial account and the commission paid for the transaction, is stored in the transaction database 160. If the authorization server 150 has identified the player 110 performing the transaction, the player's identity may also be stored in the transaction database 160 and associated with the other transaction data. If the player is awarded gaming points for performing a successful cashless gaming transaction, the points may be accumulated, stored, and associated with the player 110 on the player's club database 180. At step 570, the authorization server 150 transmits a receipt message to the gaming machine 120, and at step 580, the gaming machine 120 issues a receipt to the player 110.

Integrated Player Tracking/Cash Access System on ATM, CCCA, and Check Cashing Terminals In another aspect of the present invention, the system 100 provides for integrating player tracking and cash access transactions. As previously described, when the player 110 requests a credit transfer to the gaming machine 120 using the bank card 135, the machine may prompt the player 110 to provide the PTC 140 to identify the player to the gaming machine. Further, when the player attempts to obtain cash from the banking machine 130 using the bank card 140, the banking machine 130 may also prompt the player to provide the PTC 140 as described herein.

Figure 6:
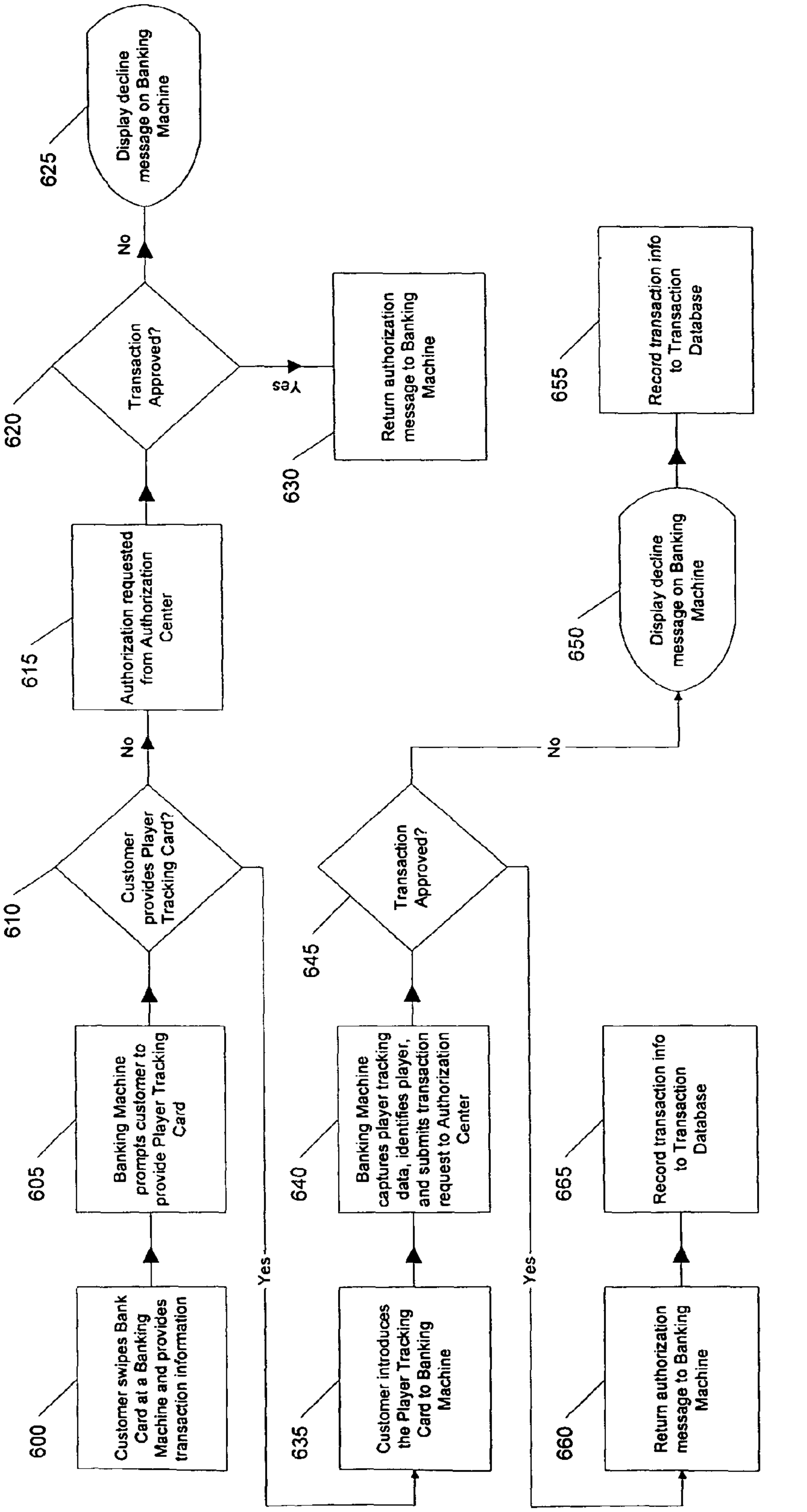
FIG. 6 is a flow diagram of a method for integrating player tracking and cash access transactions in accordance with the present invention.

With reference to FIGS. 1 and 6, to initiate a cash access transaction, the player 110 introduces the bank card 135, which is associated with the player's independent financial account, into the banking machine 130, at step 600. In a preferred embodiment, the machine readable information on the bank card 135 is encoded in a magnetic strip, and the player 110 swipes the bank card 135 through the card reader (not shown) of the banking machine 130. The card reader is configured to read the encoded magnetic strip. After the player's bank card 135 is introduced to the banking machine 130, the card reader electronically reads and decodes the machine readable information on the banking card. The banking machine 130 processes the information to translate it into a usable format.

In addition to providing the bank card 135 to the banking machine 130, the player 110 also enters into the banking machine 130 a desired cash value that the player wishes to obtain from the banking machine 130. If necessary, the player 110 will also enter a PIN, which is used to verify permission to access to the independent financial account, and any other information that is required to access funds from the independent financial account.

At step 605, the banking machine 130 prompts the player to provide the PTC 140, and at step 610, the player 110 decides whether to provide the PTC 140. If the player 110 does not decide to provide the PTC 140, the banking machine 130 proceeds with the cash access transaction. At step 615, the banking machine 130 electronically issues a request to the authorization server 150, which attempts to obtain cash from the independent financial account. The request includes the desired cash value and at least a portion of the data derived from the machine readable information on the bank card 135. Although the request attempts to transfer the desired cash value to the player 110, the total amount requested from the independent financial account may actually exceed the desired cash value to allow for commissions and bank charges that may be assessed for performing the transaction.

The authorization server 150 determines the total amount to request from the independent financial account, which is typically the desired cash value plus the commission or transaction fee. As previously described, the commission or transaction fee may be determined based on the player profile of the player 110. Once the total request amount has been established, the authorization server 150 transmits the cash request to the authorization center 190, which is associated with the independent financial account.

At step 620, the authorization center 190 determines whether to approve the request. At step 625, if the request is not approved by the authorization center 190, a decline message is transmitted from the authorization center 190 to the authorization server 150. The authorization server then 150 instructs the banking machine 130 to display a message to the player 110 indicating that the request failed. At step 630, if the request is approved by the authorization center 190, an authorization message is transmitted from the authorization center 190 to the banking machine 130. The desired cash value is dispensed by the banking machine 130 to the player 110. If a commission is required for the transaction, the additional amount of the commission is also transferred from the independent financial account to the party receiving the commission.

Returning to step 610, where the player 110 decides whether to provide the PTC 140, if the player 110 chooses to provide his or her PTC 140 to the banking machine 130, the system 100 will be able to track the cash access transaction performed by the player 110. At step 635, if the player provides the PTC 140 to the banking machine 130, the banking machine reads the PTC. The PTC 140 includes machine readable information, which is stored on the PTC by a storage means such as a magnetic strip, barcode, integrated circuit, digital image, optical memory, or finger imaging.

The banking machine 130 is configured to read the machine readable information on the PTC 140, and at step 640 the banking machine 130 attempts capture the machine readable information. If the machine readable information is encoded, the banking machine 130 attempts to decode the information into a usable format. The banking machine 130 determines whether the machine readable information on the PTC 140 is readable and correctly formatted, and, if not, the banking machine 130 displays a message to the player 110 indicating the error.

If the machine readable information is readable and correctly formatted, the banking machine 130 attempts to identify the player 110 and determine whether the PTC can be validated against the transaction database 160 or the player's club database 180 by transmitting the decoded information from the banking machine 130 to the authorization server 150. The authorization server 150 then communicates with the transaction database 160 or the player's club database 180 to verify that the PTC is valid and to identify the player 110. If the PTC cannot be validated against one of the databases, the banking machine 130 displays a message to the player 110 indicating the error. If the PTC is successfully validated, the banking machine 130 continues processing the request.

Once the banking machine 130 collects the necessary transaction information, the machine electronically issues a request to the authorization server 150, which attempts to obtain cash from the independent financial account. The request includes the desired cash value and at least a portion of the data derived from the machine readable information on the bank card 135. As described herein, the total amount requested from the independent financial account may actually exceed the desired cash value to account for commissions and bank charges that may be assessed for performing the transaction. The authorization server 150 determines the total amount to request from the independent financial account. Once the total request amount has been established, the authorization server 150 transmits the cash request to the authorization center 190, which is associated with the independent financial account.

At step 645, the authorization center 190 determines whether to approve the request. At step 650, if the request is not approved by the authorization center 190, a decline message is transmitted from the authorization center 190 to the authorization server 150. The authorization server 150 then instructs the banking machine 130 to display a message to the player 110 indicating that the request failed. Although the transaction was not successful insofar as the player 110 did not receive the requested cash, the transaction information is tracked and recorded nonetheless. At step 655, upon receiving the decline message, the authorization server 150 stores the relevant transaction information on the transaction database 160.

Returning to step 645, where the authorization center 190 determines whether to approve the request, if the request is approved by the authorization center 190, an authorization message is transmitted from the authorization center 190 to the banking machine 130 via the authorization server 150 at step 660. The desired cash value is dispensed by the banking machine 130 to the player 110. If a commission is required for the transaction, the additional amount of the commission is also transferred from the independent financial account to the party receiving the commission. At step 665, upon receiving the authorization message, the authorization server 150 stores the relevant transaction information on the transaction database 160.

Multi-Function Player Tracking Card

In yet another aspect of the present invention, the system 100 provides for an alternate method of performing integrated player tracking and cash access transactions. In this aspect of the present invention, a method is provided that facilitates player tracking and cash access transactions with a single card, rather than with the combination of the bank card 135 and the player tracking card 140. This aspect of the invention requires the player to initially provide financial account information to the casino, and that information is stored in the cashless gaming database 170. A subsequent withdrawal request can then be issued to the independent financial account without requiring a bank card, such as an ATM card or credit card, as described herein.

Figure 7:
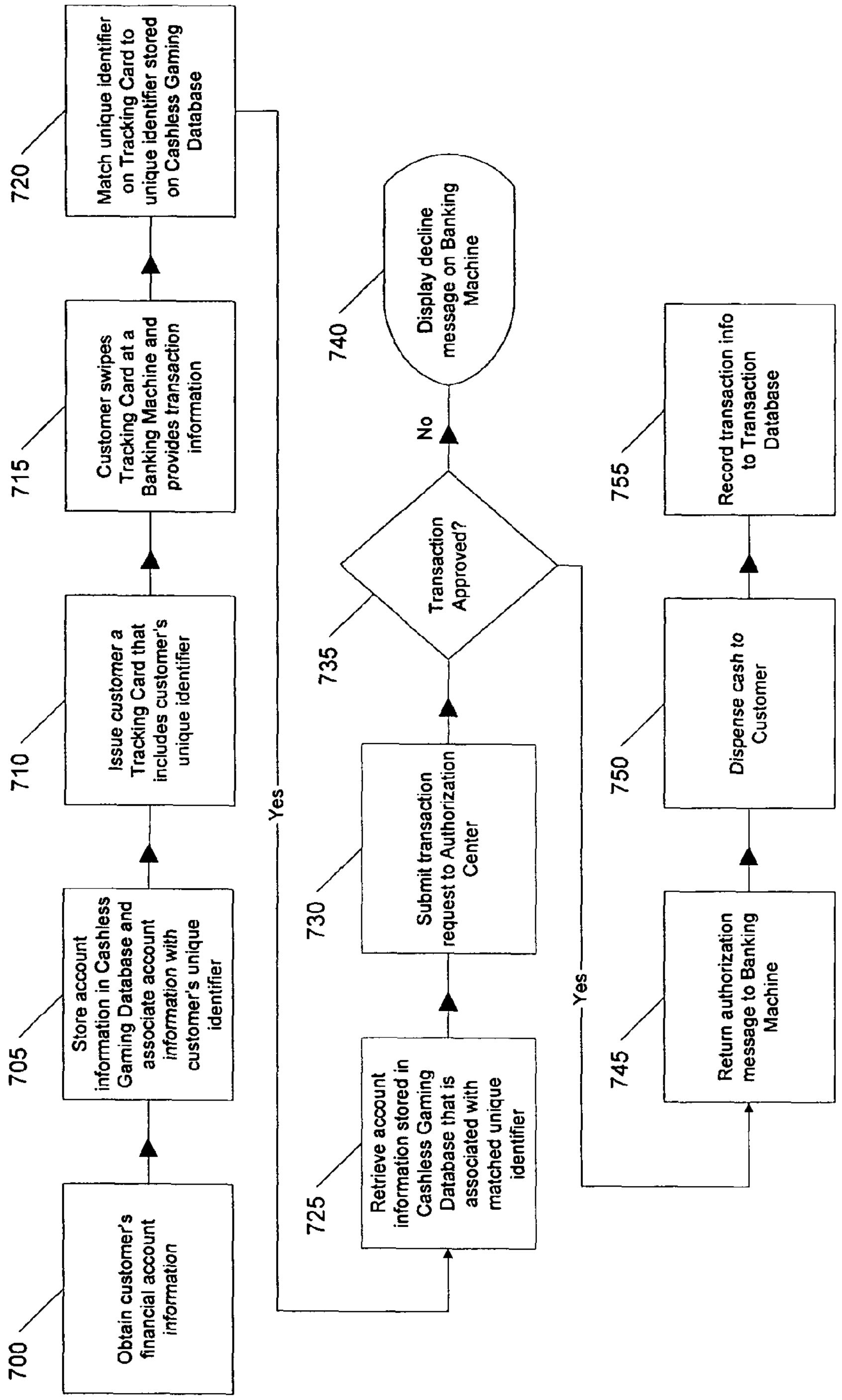
FIG. 7 is a flow diagram of a another method for integrating player tracking and cash access transactions in accordance with the present invention.

With reference to FIGS. 1 and 7, at step 700 the player 110 opens an account with the casino or with a vendor that manages accounts on the casino's behalf. To open the account, the player 110 provides specific information to the casino. This can be accomplished by the player 110 completing a form that includes personal data and information relating to the player's independent financial account. As previously described, the independent financial account may be any type of financial account, such as a banking account or credit card account. The player 110 may already have a card associated with the financial account, such as an ATM card, a credit/debit card. Alternatively, where the financial account is a checking account, the player might have existing checks that include a routing number and an account number, which the player can provide to the casino.

The account information provided by the player 110 may include data such as the player's name and other identifying information, an account and routing number, and a PIN. The player 110 may also be required to provide other personal information such as the player's address, telephone number, and social security number. The player 110 may have already provided some of this information to the casino, for instance, if the player 110 previously applied for a player tracking card 140. If the casino already has the player's personal information, it may not be necessary to re-acquire the information. The player 110 may also be required to prove his or her identity at the time the account is opened by providing a state-issued identification card, such as a driver's license.

At step 705, the information provided by the player is either entered electronically into a computer or written on a paper form and later entered into a computer by a casino representative. Once the casino has acquired the necessary information from the player 110, the financial account information and the player's personal information are stored and associated in the cashless gaming database 170. The player 110 is issued a unique identifier, typically a number or alphanumeric string, that is also stored on the cashless gaming database 170 and associated with the player's financial account information.

At step 710, once the casino has acquired the necessary personal information and financial account information from the player 110, the casino issues the player 110 a PTC 140 that bears the unique identifier that was assigned to the player 110 and stored in the cashless gaming database 170. The unique identifier borne by the PTC 140 is readable by both the gaming machine 120 and the banking machine 130. As described herein, the gaming machine 120 and the banking machine 130 can read the unique identifier on the PTC 140, communicate with the cashless gaming database 170, and match the unique identifier with the player's financial account information and personal information stored on the cashless gaming database 170.

The player 110 may now use the PTC 140 to access cash or credit from the gaming and banking machines, or to perform any other function that could otherwise be performed by an ATM card or a credit/debit card that is associated with the independent financial account. For instance, if the player 110 introduces the PTC 140 to the gaming machine 120, the player may request that a credit be added to the gaming machine directly from the independent financial account. Alternatively, if the player 110 introduces the PTC 140 to the banking machine 130, the player may issue a cash request from the financial account without providing a bank card.

The following example describes the process of accessing cash from the banking machine 130 with the PTC 140, but a similar process may be performed to access credit on the gaming machine 120 with the PTC 140. At step 715, the player 110 initiates a cash access transaction by introducing the PTC 140 into the banking machine 130. As previously described, the machine readable information on the PTC 140 is encoded, and the player 110 swipes the PTC 140 through the card reader of the banking machine 130, which handles the encoded information. After the player's PTC 140 is introduced to the banking machine 130, the card reader retrieves the unique identifier on the PTC by electronically reading and decoding the machine readable information.

In addition to providing the PTC 140 to the banking machine 130, the player 110 also enters into the banking machine 130 a desired cash value that the player 110 wishes to obtain. If necessary, the player 110 also enters a PIN, which is used to verify permission to access to the independent financial account, and any other information that is required to access funds from the independent financial account.

At step 720, the unique identifier on the PTC 140 is matched to the same unique identifier that is stored on the cashless gaming database 170. To accomplish this step, the banking machine 130 transmits the unique identifier read from the PTC 140 to the authorization server 150. The authorization server 150, in turn, communicates with the cashless gaming database 170 in an attempt to match the unique identifier with the identifiers stored on the cashless gaming database 170. The authorization server 150 transmits the unique identifier read from the PTC 140 to the cashless gaming database 170 and issues a query to determine whether the same unique identifier is stored on the cashless gaming database 170. Once the cashless gaming database 170 locates the unique identifier issued in the query, at step 725, the cashless gaming database 170 retrieves the financial account information associated with the unique identifier and transmits the appropriate financial account information to the authorization server 150. The specific financial account information retrieved is dependent upon the cash access transaction requested by the player 110 in step 715 and the type of financial account from which the cash is being requested. For instance, certain requests may require an account routing number or a PIN, whereas this information may not be appropriate for other types of cash access requests.

At step 730, the authorization server 150 electronically issues a request to obtain cash from the independent financial account. The request includes the desired cash value and at least a portion of the financial account information retrieved from the cashless gaming database 170. Although the request attempts to transfer the desired cash value to the player 110, the total amount requested from the independent financial account may actually exceed the desired cash value to account for commissions and bank charges that may be assessed for performing the transaction. The authorization server 150 determines the total amount to request from the independent financial account, and once the total request amount has been established, the authorization server 150 transmits the cash request to the authorization center 190, which is associated with the independent financial account.

At step 735, the authorization center 190 determines whether to approve the request. At step 740, if the request is not approved by the authorization center 190, a decline message is transmitted from the authorization center 190 to the authorization server 150. The authorization server then 150 instructs the banking machine 130 to display a message to the player 110 indicating that the request failed. Although the transaction was not successful insofar as the player 110 did not receive the requested cash, the transaction information is tracked and recorded nonetheless. Upon receiving the decline message, the authorization server 150 stores the relevant transaction information on the transaction database 160.

Returning to step 735, where the authorization center 190 determines whether to approve the request, if the request is approved by the authorization center 190, an authorization message is transmitted from the authorization center 190 to the banking machine 130 via the authorization server 150 at step 745. At step 750, the desired cash value is dispensed by the banking machine 130 to the player 110. If a commission is required for the transaction, the additional amount of the commission is also transferred from the independent financial account to the party receiving the commission. At step 755, the transaction information is tracked and recorded in the transaction database 160. Upon receiving the authorization message, the authorization server 150 stores the relevant transaction information on the transaction database 160.

In another aspect of the present invention, the player 110 interacting with the gaming machine 120 may similarly use the PTC 140 and the financial account information stored on the cashless gaming database 170 to transfer the desired cash value to the player by directly crediting the gaming machine 120 from the independent financial account. The steps required to perform this type of transaction are comparable to the steps described in FIG. 7, the primary differences being that the player 110 interacts with the gaming machine 120 rather than the banking machine 130 and rather than receiving the desired value in cash form, the desired value is credited directly to the gaming machine 120 from the independent financial account.

Because the transaction data may constitute valuable information to the casino, the casino may issue gaming points to the player 110 based on the number of withdrawal transactions performed by the player 110 with the PTC 140 or the amount withdrawn in those transactions. The awarded gaming points may be stored in the transaction database 160 or the player's club database 180 and associated with the unique identifier on the player's PTC 140. The system 100 thereby benefits both the player and the casino by integrating cash access and player tracking.

Figure 8:
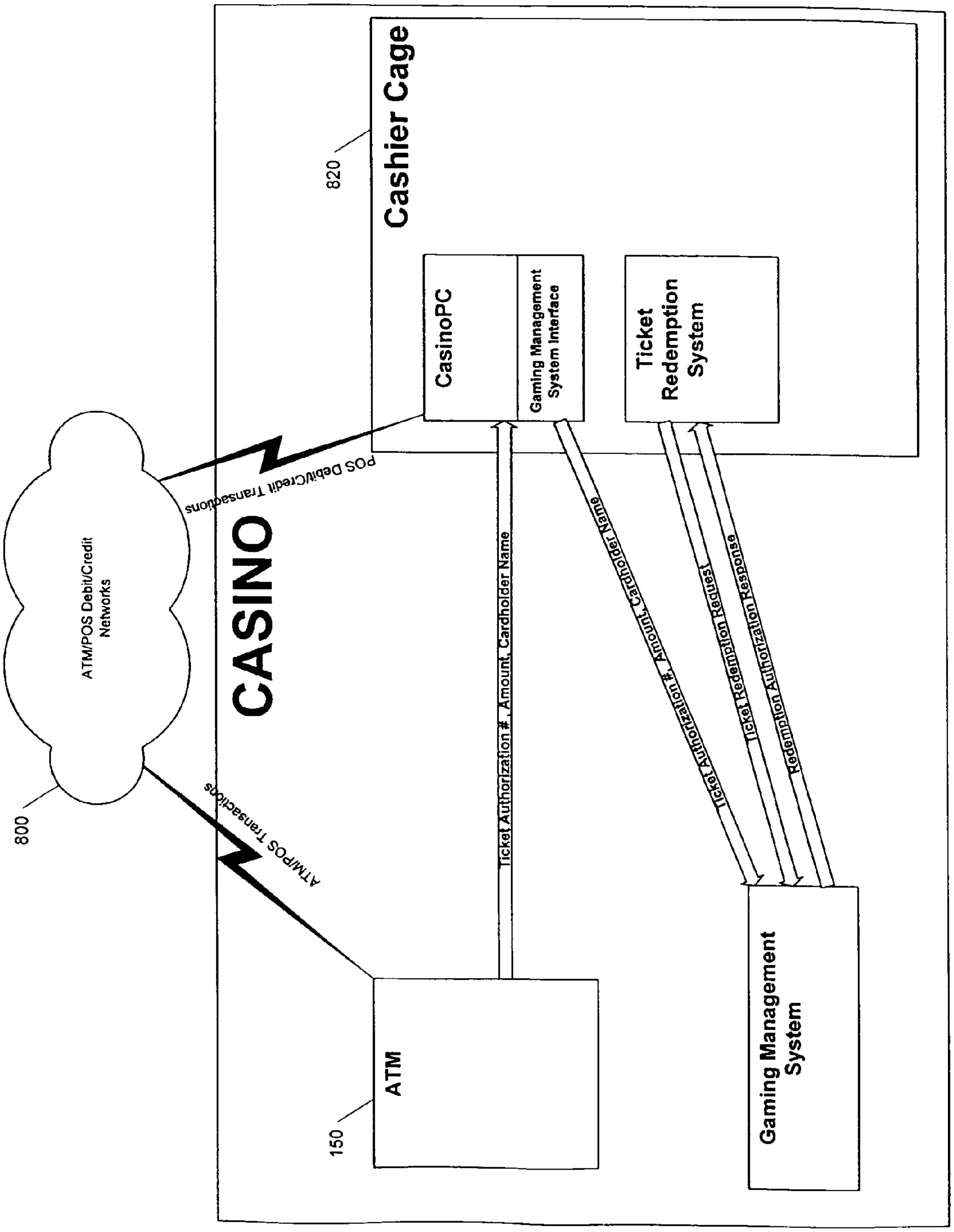
FIG. 8 provides a flow diagram illustrating one system and method that can be used for converting a ATM/POS debit/ credit transaction into a negotiable casino ticket linked to a player tracking card in accordance with the present invention.

FIG. 8 provides a flow diagram illustrating another embodiment of the present invention. In this embodiment, the banking machine 140 can be used to dispense a casino ticket or other identification card that represents a cash value. In the first step, the casino patron (customer) swipes their identification card (such as a debit card, a credit card, a state issued ID or other identification token) and selects a financial transaction. In this example, the selected financial transaction would be the acquisition of a casino "ticket". Following selection, an amount of money is entered and an account type is selected, such as an ATM and/or POS debit or credit request. In the preferred embodiment, an account type is selected in order to minimize any fees, overhead and/or monetary limits. For example, a POS debit transaction may be preferred because it provides a higher limit withdrawal limit. Once the withdrawal amount and financial account have been collected, the banking machine 140 requires confirmation of identity by asking for a secret password, or code or other security device. Once the player 110 confirms his/her identity, the banking machine 140 will perform the requested transaction by transmitting request information to the ATM/Credit/POS debit network 800.

In the preferred embodiment, a third party intermediary records audit information associated with any requests and approvals in order to support redemption and anti-fraud detection systems managed by a casino or by the third party intermediary. Following approval of the transaction and creation of an audit trail, a casino ticket (not shown) with the withdrawal value (or some portion thereof) is issued to the player 110 by the banking machine 140. In this context, a casino ticket can be any number of identification cards or systems including a paper ticket with a bar code, a magnetic stripe card, a smart card, RFID or other portable digital memory that is encoded with personal and financial information. This casino ticket can then be used on a gaming machine as credit in connection with casino gaming or redeemed for cash. In the preferred embodiment, the customer 120 can either present the casino ticket for validation by a cashier at a cashier cage 820 or insert the casino ticket into a ticket redemption kiosk (including kiosks integrated with one or more casino game machines or other multi-purpose entertainment devices).

FIG. 8 provides a flow diagram illustrating one system that can be used for converting a ATM/POS debit/credit transaction into a negotiable casino ticket that can be linked to a player tracking system. As one skilled in the art would know, such a system provides a number of advantages over the prior art. The casino ticket could be negotiable within different areas (such as a group of mutually linked casinos, restaurants and service providers), to acquire different products or services (such as 50% or more must be used to purchase goods), to trigger different bonuses or awards (free games, discounts, casino points), or any number of features that either limit negotiation or enhance the functionality and features available to the player 110.

For example, a customer/player 110 could link a debit card with a player-tracking card in a casino database such that, whenever that same debit card is used to acquire a casino ticket, the ticket is encoded with that customer's player tracking code or ID. This could further be used to initiate certain security procedures or verifications that are stored in the casino's database that is associated with that player tracking code. A player could be asked to enter certain identification information (something they know, something they have or something they are) on certain types of types of machines. Likewise, gaming features could be provided at casino gaming machines in which such a casino ticket was entered. A customer that has entered a casino ticket onto a game machine could be provided with gaming audio and visual content that is associated with the user in the casino's player tracking/customer database. This embodiment provides a number of advantages. The casino ticket provides a simple financial tool that is highly managed from both an access standpoint (through dynamic security), from a negotiation standpoint (where it can be used and how) that is still highly portable and personalized.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments that have been described in detail therein. Rather, reference should be made to the appended claims as indicative of the scope and content of the present invention.

What is claimed is:

1. A method for conducting cashless gaming fund transfers on a gaming machine, the method comprising:

receiving from a customer, in a gaming environment, independent pre-existing financial account information of the customer maintained by a financial institution outside the gaming environment, the independent pre-existing financial account information comprising information required to conduct electronic financial transactions with an independent financial account of the customer at a financial institution including at least an account number, an associated PIN, and a financial institution routing number, the independent pre-existing financial account being associated with a bank card;

storing, in a gaming database maintained by the gaming environment, the independent pre-existing financial account information including at least the account number, the associated PIN, and the financial institution routing number;

issuing a unique identifier for the customer;

storing, in the gaming database, the unique identifier for the customer;

associating, in the gaming database, the unique identifier of the customer with the independent pre-existing financial account information required to conduct electronic financial transactions with the financial institution and used to access the independent financial account of the customer;

issuing to the customer a card containing machine readable information including the unique identifier, the card being different than the bank card;

reading, through a card reader of the gaming machine, the machine readable information on the card, without reading the bank card issued by the financial institution containing the independent pre-existing financial account information;

electronically decoding the machine readable information received from the card reader and retrieving the unique identifier therefrom;

receiving on the gaming machine a desired credit value from the customer;

transmitting the unique identifier from the gaming machine, without transmitting the independent pre-existing financial account information on the bank card issued by the financial institution from the gaming machine, to an authorization server capable of communicating with an external authorization center to request authorization for the desired credit value;

matching the unique identifier transmitted to the authorization server with one of a plurality of unique identifiers stored on the gaming database;

retrieving, from the gaming database, the independent financial account information associated with the unique identifier;

transmitting, to the authorization server, the independent financial account information retrieved from the gaming database;

electronically issuing a request from the authorization server to the authorization center to confirm the availability of the desired credit value from the independent financial account, the request including at least a portion of the independent financial account information retrieved from the gaming database and the desired credit value received on the gaming machine, and the request from the authorization server not including the machine readable information read through the card reader of the gaming machine; and crediting the gaming machine, upon approval of the request by the authorization center, with the desired credit value directly from the financial institution.

2. The method of claim 1 wherein the method further includes the step of storing at least a portion of said desired credit value in a local memory of the gaming machine thereby enabling gameplay.

3. The method of claim 1 wherein the card is a player tracking card issued by a gaming establishment.

4. The method of claim 1 wherein the card is an ATM card.

5. The method of claim 4, wherein the ATM card is further used to identify and track the customer in a player tracking database managed by a gaming establishment.

6. The method of claim 1 wherein the card is a credit card.

7. The method of claim 6, wherein the credit card is further used to identify and track in a player tracking database managed by a gaming establishment.

8. The method of claim 1 wherein the card is a POS debit card.

9. The method of claim 8, wherein the POS debit card is further used to identify and track the customer in a player tracking database managed by a gaming establishment.

10. The method of claim 1 wherein the machine-readable information includes information stored in a magnetic strip and the gaming machine includes a magnetic strip reader.

11. The method of claim 1 wherein the request is transmitted to the authorization center authorized by the financial institution to process credit requests such that the authorization center receives the desired credit value and at least a portion of the independent financial account information retrieved from the gaming database, and wherein the gaming machine receives approval of the request from the authorization center.

12. The method of claim 11, wherein the authorization center is a financial intermediary between the gaming machine and the independent financial account.

13. The method of claim 12, wherein the method further includes the step of storing one or more requested financial transactions and not processing such requests until a predetermined event has occurred.

14. The method of claim 13, wherein the predetermined event is the customer requesting credits that exceed a predetermined credit limit.

15. The method of claim 13, wherein the predetermined event is a customer checking out of a hotel or casino.

16. The method of claim 1, wherein the gaming machine uniquely identifies the customer for tracking purposes and associates the desired credit value transferred from the independent financial account with the customer in a player tracking database.

17. The method of claim 1, wherein the step of reading the machine readable information on the card further includes processing an additional card, said additional card being the bank card issued by the financial institution.

18. The method of claim 1, wherein the step of retrieving the independent financial account information associated with the unique identifier from the gaming database includes retrieving the independent financial account information for a plurality of independent financial accounts that are associated with the unique identifier.

19. The method of claim 18, further comprising the step of receiving, at the gaming machine, a selection from the customer of one of the plurality of independent financial accounts associated with the unique identifier.

20. The method of claim 1, wherein the request is a request to perform an Automated Clearing House (ACH) debit transfer, and wherein the cashless gaming fund transfer of the desired credit value to a local financial account from the independent financial institution is an Automated Clearing House (ACH) debit transfer.

21. The method of claim 20, wherein the step of receiving the independent financial account information from the customer includes reading the bank card of the customer, said bank card being issued to the customer by said financial institution.

22. The method of claim 1, further comprising performing a plurality of subsequent cashless gaming fund transfers on the gaming machine with more than one of a plurality of independent financial accounts without the customer re-presenting the card to the gaming machine.

23. The method of claim 1, wherein the unique identifier retrieved from the machine readable information and transmitted from the gaming machine does not include any portion of the independent financial account information required to perform an electronic financial transaction with the independent financial account associated with unique identifier on the card.

24. The method of claim 1, wherein the authorization server utilizes the independent financial account information retrieved from the gaming database to enable the customer to initiate subsequent cashless gaming fund transfers on the gaming machine with the financial institution without re-presenting the card to the gaming machine.

25. The method of claim 1, wherein the gaming machine is a slot machine in the gaming environment.

26. The method of claim 1, further comprising receiving the independent financial account information from the customer and associating the unique identifier with the independent financial account information prior to performing the cashless gaming fund transfers with the card.

27. The method of claim 26, further comprising verifying a state-issued identification card to verify identity of the customer prior to associating the unique identifier with the independent financial account information.

28. The method of claim 1, further comprising associating the unique identifier with the independent financial account information prior to performing the cashless gaming fund transfers with the card.

29. The method of claim 28, wherein the identifier is derived from the machine readable information on the card.

30. The method of claim 1, wherein the machine-readable information includes information stored in a barcode and the step of reading the machine-readable information includes reading the barcode.

31. The method of claim 1, the step of receiving independent financial account information from the customer includes receiving a Personal Identification Number, and the independent financial account information includes said Personal Identification Number, said Personal Identification Number being required by the gaming machine prior to requesting the transfer.

32. The method of claim 1, wherein the independent financial account information includes personal information of the customer.

33. The method of claim 32, wherein the personal information includes a customer name, a customer address, a customer telephone number, a customer social security number, and information from a customer state-issued identification card.

34. The method of claim 1, wherein the request is a Point of Sale (POS) debit request.

35. A method for conducting cashless gaming fund transfers on a gaming machine with an external independent financial account, the method comprising:

receiving from a customer, in a gaming environment, preexisting independent financial account information of the customer maintained by a financial institution outside the gaming environment, the pre-existing independent financial account information comprising information required to conduct electronic financial transactions with a pre-existing independent financial account of the customer at the financial institution, including at least an account number, an associated PIN, and a financial institution routing number;

storing, in a gaming database, the pre-existing independent financial account information, said pre-existing independent financial account information including at least the account number, the associated PIN, and the financial institution routing number;

issuing a unique identifier for the customer;

storing, in the gaming database, the unique identifier for the customer;

associating, in the gaming database, the unique identifier of the customer with the pre-existing independent financial account information required to conduct the electronic financial transaction with the financial institution and access the pre-existing independent financial account;

issuing to the customer a casino-issued card containing machine readable information including the unique identifier;

reading, through a card reader of the gaming machine, the machine readable information on the casino-issued card, without reading a bank card issued by the financial institution containing the independent pre-existing financial account information;

electronically decoding the machine readable information received from the card reader and retrieving the unique identifier therefrom;

receiving on the gaming machine a transaction type selection and a desired deposit value from the customer;

transmitting the unique identifier from the gaming machine, without transmitting the independent pre-existing financial account information on the bank card issued by the financial institution from the gaming machine, to an authorization server capable of communicating with an external authorization center to request authorization for the desired deposit value;

matching the unique identifier transmitted to the authorization server with one of a plurality of unique identifiers stored on the gaming database;

retrieving, from the gaming database, the independent financial account information associated with the unique identifier;

transmitting, to the authorization server, the independent financial account information retrieved from the gaming database;

electronically issuing a deposit request from the authorization server to the authorization center requesting approval to deposit funds into the preexisting independent financial account, the deposit request including at least a portion of the independent financial account information retrieved from the gaming database and the desired deposit value received on the gaming machine, and the deposit request from the authorization server not including the machine readable information read through the card reader of the gaming machine; and transferring, upon approval of the deposit request by the authorization center, the desired deposit value directly from the gaming machine to the preexisting independent financial account at the independent financial institution.

36. The method of claim 35, wherein the gaming machine is a slot machine in the gaming environment.

37. The method of claim 35, wherein the casino-issued card is a player tracking card issued by a gaming establishment.

38. The method of claim 35, wherein the casino-issued card is an ATM card.

39. The method of claim 38, wherein the ATM card is further used to identify and track the customer in a player tracking database managed by a gaming establishment.

40. The method of claim 35, wherein the casino-issued card is a credit card.

41. The method of claim 40, wherein the credit card is further used to identify and track in a player tracking database managed by a gaming establishment.

42. The method of claim 35, wherein the casino-issued card is a POS debit card.

43. The method of claim 42, wherein the POS debit card is further used to identify and track the customer in a player tracking database managed by a gaming establishment.

44. The method of claim 35, wherein the machine readable information includes a magnetic strip and the gaming machine includes a magnetic strip reader.

45. The method of claim 35, wherein the transaction type selection is a credit transaction, thereby initiating the following additional steps:

transmitting a request to the authorization center such that the authorization center receives the desired deposit value and at least a portion of the independent financial account information, and receiving confirmation that the request has been performed from the authorization center.

46. The method of claim 35, where the selected transaction type is the gaming machine debit transaction, the deposit request is transmitted to an authorization center such that the authorization center receives the desired deposit value and at least a portion of the independent financial account information, and the gaming machine receives approval for the deposit request from the authorization center.

47. The method of claim 35, wherein the request is a request to perform an Automated Clearing House (ACH) debit transfer, and wherein the cashless gaming fund transfer of the desired debit value to the independent financial institution is an Automated Clearing House (ACH) debit transfer.

48. The method of claim 35, wherein the authorization server utilizes the independent financial account information retrieved from the gaming database to enable the customer to initiate subsequent cashless gaming fund transfers on the gaming machine with the financial institution without re-presenting the casino-issued card to the gaming machine.

49. The method of claim 35, wherein the gaming machine uniquely identifies the customer for tracking purposes and associates the desired debit value transferred to the independent financial account with the customer in a player tracking database.

50. The method of claim 35, the step of receiving independent financial account information from the customer includes receiving a Personal Identification Number, and the independent financial account information includes said Personal Identification Number, said Personal Identification Number being required by the gaming machine prior to requesting the transfer.

51. The method of claim 35, wherein the step of electronically processing the casino-issued card to retrieve machine readable information thereon further includes processing the bank card.

52. The method of claim 35, wherein the unique identifier retrieved from the machine readable information and transmitted from the gaming machine does not include any portion of the independent financial account information required to perform an electronic financial transaction with the independent financial account associated with unique identifier on the casino-issued card.

53. The method of claim 35, further comprising receiving the independent financial account information from the customer and associating the unique identifier with the independent financial account information prior to performing the cashless gaming fund transfers with the casino-issued card.

54. The method of claim 53, further comprising verifying a state-issued identification card to verify identity of the customer prior to associating the unique identifier with the independent financial account information.

55. The method of claim 35, further comprising associating the unique identifier with the independent financial account information prior to performing the cashless gaming fund transfers with the casino-issued card.

56. The method of claim 55, wherein the identifier is derived from the machine readable information on the bank card.

57. The method of claim 35, wherein the machine-readable information includes information stored in a barcode and the step of reading the machine-readable information includes reading the barcode.

58. The method of claim 35, wherein the independent financial account information includes personal information of the customer.

59. The method of claim 58, wherein the personal information includes a customer name, a customer address, a customer telephone number, a customer social security number, and information from a customer state-issued identification card.

* * * * *